(12) United States Patent
Han et al.

(10) Patent No.: US 9,574,074 B2
(45) Date of Patent: Feb. 21, 2017

(54) CARBOXYLIC ACID MODIFIED-NITRILE BASED COPOLYMER COMPOSITION AND DIP-FORM ARTICLE THEREOF

(71) Applicant: LG CHEM, LTD., Seoul (KR)

(72) Inventors: Jung Su Han, Daejeon (KR); Seung Uk Yeu, Daejeon (KR); Seung Hun Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 297 days.

(21) Appl. No.: 14/371,362

(22) PCT Filed: Dec. 18, 2013

(86) PCT No.: PCT/KR2013/011771
§ 371 (c)(1),
(2) Date: Jul. 9, 2014

(87) PCT Pub. No.: WO2014/142424
PCT Pub. Date: Sep. 18, 2014

(65) Prior Publication Data
US 2016/0272794 A1    Sep. 22, 2016

(30) Foreign Application Priority Data

Mar. 13, 2013 (KR) .................. 10-2013-0026750
Jul. 24, 2013 (KR) .................. 10-2013-0087128

(51) Int. Cl.
*C08L 9/04* (2006.01)
*B29C 41/00* (2006.01)
*B29C 41/14* (2006.01)
*B29K 9/06* (2006.01)

(52) U.S. Cl.
CPC ................ *C08L 9/04* (2013.01); *B29C 41/003* (2013.01); *B29C 41/14* (2013.01); *B29K 2009/06* (2013.01)

(58) Field of Classification Search
CPC ....... C08L 9/04; B29C 41/003; B29K 2009/06
See application file for complete search history.

(56) References Cited

U.S. PATENT DOCUMENTS 6,844,385 B1 *  1/2005  Hagiwara ............ C08F 236/12
                                                            264/299

FOREIGN PATENT DOCUMENTS

| CN | 102159604 A | 8/2011 |
|---|---|---|
| CN | 102224177 A | 10/2011 |
| EP | 0524836 A1 | 1/1993 |
| JP | 2003-213197 A | 7/2003 |
| KR | 100235128 | 3/2000 |
| KR | 100357412 | 2/2003 |
| KR | 1020070114106 | 11/2007 |
| KR | 1020100033125 | 3/2010 |
| KR | 1020120069222 | 6/2012 |
| KR | 10-2012-0083031 A | 7/2012 |
| KR | 10-2013-0055334 A | 5/2013 |
| KR | 1020130056505 A | 5/2013 |

* cited by examiner

*Primary Examiner* — Robert Jones, Jr.
(74) *Attorney, Agent, or Firm* — Dentons US LLP

(57) ABSTRACT

Disclosed are a carboxylic acid modified-nitrile based copolymer composition and a dip-formed article produced therefrom. More specifically, disclosed are a copolymer composition comprising a carboxylic acid modified-nitrile copolymer latex having a glass transition temperature of a −60 to −10° C. and a carboxylic acid modified-styrene copolymer latex having a glass transition temperature of 30 to 110° C., and a dip-formed article produced therefrom.

Provided are advantageously a carboxylic acid modified-nitrile based copolymer composition enabling production of dip-formed articles having physical properties comparable to conventional articles and greatly improved wearing sensation and doping property, and a dip-formed article produced therefrom.

17 Claims, No Drawings

CARBOXYLIC ACID MODIFIED-NITRILE BASED COPOLYMER COMPOSITION AND DIP-FORM ARTICLE THEREOF

This application is a 35 USC §371 National Stage entry of International Application No. PCT/KR2013/011771, filed on Dec. 18, 2013, which claims priority from Korean Patent Application Nos. 10-2013-0026750, filed on Mar. 13, 2013 and 10-2013-0087128, filed on Jul. 24, 2013, in the Korean Intellectual Property Office, all of which are incorporated herein by reference in their entirety.

TECHNICAL FIELD

The present invention relates to a carboxylic acid modified-nitrile based copolymer composition and a dip-formed article produced therefrom. More specifically, the present invention relates to a carboxylic acid modified-nitrile based copolymer composition which enables production of dip-formed articles having physical properties comparable to conventional dip-formed articles and greatly improved wearing sensation and doping property, and a dip-formed article produced therefrom.

BACKGROUND ART

Rubber gloves are widely used in housewares, food, electronics, medicine and the like. However, when wearing sensation of gloves and doping property during working are low, working efficiency of workers is deteriorated. Generally, rubber glove products are manufactured by a dipping process, and gloves are surface-treated with a substance such as a talcum powder or a corn powder to prevent adhesiveness of the glove surfaces and provide easy wearing during a post-process, and are then packaged. However, the powder may stain the hands wearing gloves and cause contamination upon working in a clean room.

U.S. Pat. No. 3,411,982 discloses modifying an outer surface of rubber gloves by halogenation to improve slippage of rubber gloves. The halogenation is carried out by dipping a rubber glove in a sodium hypochlorite solution containing 1 to 5% of chlorine for about 8 to about 10 seconds, immediately washing the rubber glove, drying the same and then dipping the rubber glove in a 12% hydrochloric acid solution for about 8 to about 10 seconds. The series of steps are repeated on the inner surface of the rubber glove. However, such treatment with chlorine is disadvantageously inconvenient and causes damage of harmful chlorine components to worker health.

In addition, U.S. Pat. Nos. 3,813,695, 3,326,742 and 3,585,103, GB Patent No. 1,028,446 etc. disclose coating inner and outer surfaces of surgical gloves with a hydrogel polymer solution to improve slippage of the surgical gloves. The hydrogel polymer solution is polyvinyl pyrrolidone, polyhydroxyethyl methacrylate, polymethylmethacrylate, polyhydroxypropylacrylate or the like, or a polymer thereof. However, the hydrogel polymer solution has problems of low economic feasibility due to high price and addition of a coating process and inconvenience.

DISCLOSURE

Technical Problem

Therefore, the present invention has been made in view of the above problems, and it is an object of the present invention to provide a carboxylic acid modified-nitrile based copolymer composition which enables production of dip-formed articles having physical properties comparable to conventional dip-formed articles, and greatly improved wearing sensation and doping property, and a dip-formed article produced therefrom.

Technical Solution

In accordance with one aspect of the present invention, provided is a copolymer composition comprising a carboxylic acid modified-nitrile copolymer latex (hereinafter, referred to as "latex A") having a glass transition temperature of −60 to −10° C. and a carboxylic acid modified-styrene copolymer latex (hereinafter, referred to as "latex B") having a glass transition temperature of 30 to 110° C.

When the glass transition temperature of the latex A is lower than −60° C., wearing sensation and doping property are not improved although the latex A is mixed with the latex B and when the glass transition temperature of the latex A is higher than −10° C., mechanical properties of products are deteriorated, as compared to those of conventional products.

In addition, when the glass transition temperature of the latex B is lower than 30° C., wearing sensation and doping property are deteriorated and when the glass transition temperature of the latex B is higher than 110° C., mechanical properties are disadvantageously deteriorated.

In addition, the present invention provides a dip-formed article produced from the copolymer composition.

In accordance with another aspect of the present invention, provided is a method for producing a dip-formed article including a) applying a coagulant solution to a mold, followed by drying; b) applying a carboxylic acid modified-nitrile based copolymer composition for dip-forming to the coagulant-applied mold to form a dip-forming layer; c) cross-linking the dip-forming layer; and d) peeling the cross-linked dip-forming layer from the mold to obtain a dip-formed article.

The latex A is prepared by adding a conjugated diene monomer, an ethylenically unsaturated nitrile monomer and an ethylenically unsaturated acid monomer, adding optionally another monomer copolymerizable with these monomers and at least one selected from the group consisting of an emulsifier, a polymerization initiator, a molecular weight adjuster and other additives, followed by polymerization.

The conjugated diene monomer comprises at least one selected from the group consisting of 1,3-butadiene, 2,3-dimethyl-1,3-butadiene, 2-ethyl-1,3-butadiene, 1,3-pentadiene and isoprene, but the present invention is not limited thereto.

The ethylenically unsaturated nitrile monomer comprises at least one selected from the group consisting of acrylonitrile, methacrylonitrile, fumaronitrile, α-chloronitrile and α-cyanoethylacrylonitrile, but the present invention is not limited thereto.

The ethylenically unsaturated acid monomer comprises at least one selected from the group consisting of an ethylenically unsaturated carboxylic acid monomer, an ethylenically unsaturated sulfonic acid monomer and an ethylenically unsaturated acid anhydride monomer. More specifically, the ethylenically unsaturated acid monomer comprises at least one selected from the group consisting of acrylic acid, methacrylic acid, itaconic acid, maleic acid, fumaric acid, maleic anhydride, citraconic anhydride, styrenesulfonic acid, monobutyl fumarate, monobutyl maleate and mono-2-hydroxypropyl maleate, but the present invention is not limited thereto.

The optionally added other monomer copolymerizable with these monomers comprises at least one selected from the group consisting of: aromatic vinyl monomers selected from the group consisting of styrene, alkylstyrene and vinyl naphthalene; fluoroalkyl vinyl ethers such as fluoroethyl vinyl ether; ethylenically unsaturated amide monomers selected from the group consisting of (meth) acrylamide, N-methylol (meth) acrylamide, N,N-dimethylol (meth)acrylamide, N-methoxymethyl (meth)acrylamide and N-propoxymethyl (meth)acrylamide; non-conjugated diene monomers such as vinyl pyridine, vinyl norbornene, dicyclopentadiene and 1,4-hexadiene; and ethylenically unsaturated carboxylic acid ester monomers selected from the group consisting of methyl (meth)acrylate, ethyl (meth) acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth) acrylate, cyanomethyl (meth) acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxymethyl (meth)acrylate, hydroxyethyl (meth)acrylate, hydroxypropyl (meth)acrylate, glycidyl (meth)acrylate and dimethylaminoethyl (meth) acrylate, but the present invention is not limited thereto.

The emulsifier comprises at least one selected from the group consisting of alkylbenzene sulfonate, aliphatic sulfonate, sulfate ester of alcohol, α-olefin sulfonate and alkyl ether sulfate ester, but the present invention is not limited thereto.

The polymerization initiator comprises at least one selected from the group consisting of sodium persulfate, potassium per sulfate, ammonium persulfate, potassium perphosphate, hydrogen peroxide, t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, t-butylperoxy isobutyrate, azobisisobutyronitrile, azobis-2,4-dimethylvaleronitrile, azobiscyclohexane carbonitrile and methyl azobisisobutyrate, but the present invention is not limited thereto.

The molecular weight adjuster comprises at least one selected from the group consisting of α-methylstyrene dimers, t-dodecyl mercaptan, n-dodecyl mercaptan, octyl mercaptan, carbon tetrachloride, methylene chloride, methylene bromide, tetraethylthiuram disulfide, dipentamethylenethiuram disulfide and diisopropylxanthogen disulfide, but the present invention is not limited thereto.

The other additive comprises at least one selected from the group consisting of sodium formaldehyde sulfoxylate, sodium ethylenediaminetetraacetate, ferrous sulfate, dextrose, sodium pyrophosphate and sodium sulfite, but the present invention is not limited thereto.

The latex B is prepared by adding a conjugated diene monomer, an aromatic vinyl monomer, an ethylenically unsaturated nitrile monomer and an ethylenically unsaturated acid monomer, and adding optionally another monomer copolymerizable with these monomers and at least one selected from the group consisting of an emulsifier, a polymerization initiator, a molecular weight adjuster and other additives, followed by polymerization.

The conjugated diene monomer comprises at least one selected from the group consisting of 1,3-butadiene, 2,3-dimethyl-1,3-butadiene, 2-ethyl-1,3-butadiene, 1,3-pentadiene and isoprene, but the present invention is not limited thereto.

The aromatic vinyl monomer comprises at least one selected from the group consisting of styrene and alpha-methyl styrene, but the present invention is not limited thereto.

The ethylenically unsaturated nitrile monomer comprises at least one selected from the group consisting of acrylonitrile, methacrylonitrile, fumaronitrile, α-chloronitrile and α-cyanoethylacrylonitrile, but the present invention is not limited thereto.

The ethylenically unsaturated acid monomer comprises at least one selected from the group consisting of an ethylenically unsaturated carboxylic acid monomer, an ethylenically unsaturated sulfonic acid monomer and an ethylenically unsaturated acid anhydride monomer. More specifically, the ethylenically unsaturated acid monomer comprises at least one selected from the group consisting of acrylic acid, methacrylic acid, itaconic acid, maleic acid, fumaric acid, maleic anhydride, citraconic anhydride, styrenesulfonic acid, monobutyl fumarate, monobutyl maleate and mono-2-hydroxypropyl maleate, but the present invention is not limited thereto.

The optionally added other monomer copolymerizable with these monomers comprises at least one selected from the group consisting of: aromatic vinyl monomers selected from the group consisting of alkylstyrene and vinyl naphthalene; fluoroalkyl vinyl ethers such as fluoroethyl vinyl ether; ethylenically unsaturated amide monomers selected from the group consisting of (meth)acrylamide, N-methylol (meth)acrylamide, N,N-dimethylol (meth)acrylamide, N-methoxymethyl (meth)acrylamide and N-propoxymethyl (meth)acrylamide; non-conjugated diene monomers such as vinyl pyridine, vinyl norbornene, dicyclopentadiene and 1,4-hexadiene; and ethylenically unsaturated carboxylic acid ester monomers selected from the group consisting of methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth) acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxymethyl (meth) acrylate, hydroxyethyl (meth) acrylate, hydroxypropyl (meth)acrylate, glycidyl (meth)acrylate and dimethylaminoethyl (meth)acrylate, but the present invention is not limited thereto.

The emulsifier comprises at least one selected from the group consisting of alkylbenzene sulfonate, aliphatic sulfonate, sulfate ester of alcohol, α-olefin sulfonate and alkyl ether sulfate ester, but the present invention is not limited thereto.

The polymerization initiator comprises at least one selected from the group consisting of sodium persulfate, potassium persulfate, ammonium persulfate, potassium perphosphate, hydrogen peroxide, t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, t-butylperoxy isobutyrate, azobisisobutyronitrile, azobis-2,4-dimethylvaleronitrile, azobiscyclohexane carbonitrile and methyl azobisisobutyrate, but the present invention is not limited thereto.

The molecular weight adjuster comprises at least one selected from the group consisting of α-methylstyrene dimers, t-dodecyl mercaptan, n-dodecyl mercaptan, octyl mercaptan, carbon tetrachloride, methylene chloride, methylene bromide, tetraethylthiuram disulfide, dipentamethylenethiuram disulfide and diisopropylxanthogen disulfide, but the present invention is not limited thereto.

The other additive comprises at least one selected from the group consisting of sodium formaldehyde sulfoxylate, sodium ethylenediaminetetraacetate, ferrous sulfate, dextrose, sodium pyrophosphate and sodium sulfite, but the present invention is not limited thereto. The carboxylic acid modified-nitrile based copolymer composition may further comprise at least one selected from the group consisting of a vulcanizing agent, an ionic crosslinking agent, a pigment, a filler, a thickener and a pH controller.

Advantageous Effects

As apparent from the fore-going, the present invention has the effect of providing a carboxylic acid modified-nitrile based copolymer composition which enables production of dip-formed articles having physical properties comparable to conventional dip-formed articles, and greatly improved wearing sensation and doping property, and a dip-formed article produced therefrom.

Best Mode

In order to accomplish the objects, the present invention provides a copolymer composition comprising two or more types of latexes having different glass transition temperatures, unlike a conventional invention.

In general, articles produced from a latex composition for dip-forming comprising a latex having a low glass transition temperature have a sticky surface, thus having deteriorated wearing sensation and doping property, and articles produced from a latex composition for dip-forming comprising a latex having a high glass transition temperature have superior wearing sensation and doping property, but are unsuitable in use for products for dip-forming due to greatly deteriorated mechanical properties.

The present invention provides a latex composition for dip-forming comprising the two or more types of latexes having different glass transition temperatures wherein the latex composition is specially designed to exhibit only advantages of the latexes, thus accomplishing the objects of the present invention.

Hereinafter, the carboxylic acid modified-nitrile based copolymer composition and the dip-formed article produced therefrom according to the present invention will be described in detail.

For example, the latex A according to the present invention has a glass transition temperature of −60 to −10° C., −55 to −10° C., −50 to −15° C., −40 to −15° C. or −37 to −15° C. Within this range, wearing sensation and doping property are advantageously excellent without deterioration in mechanical properties.

The latex A has, for example, an average polymer particle diameter of 100 to 160 nm, 110 to 150 nm, or 120 to 140 nm. Within this range, products such as films to which the latex A is applied have advantages of superior film properties, uniformity and strength.

The latex A according to the present invention is for example present in an amount of 76 to 98% by weight, 85 to 97% by weight or 85 to 90% by weight, based on 100% by weight which is the total weight of the latexes A and B. Within this range, wearing sensation and doping property are advantageously excellent without deterioration in mechanical properties.

The latex B according to the present invention has, for example, a glass transition temperature of 30 to 110° C., 35 to 105° C., or 40 to 100° C. Within this range, wearing sensation and doping property are advantageously excellent without deterioration in mechanical properties.

The latex B has, for example, an average particle diameter of 160 to 260 nm, 170 to 250 nm, or 180 to 240 nm. Within this range, products such as films to which the latex B is applied have advantages of superior film properties, uniformity and strength.

For example, the average particle diameter of the latex B is not the same as that of the latex A.

The latex B according to the present invention is present in an amount of, for example, 2 to 24% by weight or 3 to 15% by weight, based on 100% by weight which is the total weight of the latexes A and B. Within this range, wearing sensation and doping property are advantageously excellent without deterioration in mechanical properties.

The copolymer composition of the present invention may for example comprise the latex A and the latex B (latex A:latex B) at a weight ratio of 98:2 to 76:24 (based on solid content), or at a weight ratio of 97:3 to 85:15, or 89:11 to 91:9. Within this range, wearing sensation, doping property and mechanical properties are advantageously excellent.

The latex A is prepared by adding a conjugated diene monomer, an ethylenically unsaturated nitrile monomer and an ethylenically unsaturated acid monomer, adding optionally another monomer copolymerizable with these monomers and at least one selected from the group consisting of an emulsifier, a polymerization initiator, a molecular weight adjuster and other additives, followed by polymerization.

The conjugated diene monomer, the ethylenically unsaturated nitrile monomer, the ethylenically unsaturated acid monomer, the optionally added other monomer copolymerizable with these monomers, the emulsifier, the polymerization initiator, the molecular weight adjuster and other additives are not particularly limited and may be selected from those well known in the art and specific examples thereof will be described below.

The conjugated diene monomer comprises at least one selected from the group consisting of 1,3-butadiene, 2,3-dimethyl-1,3-butadiene, 2-ethyl-1,3-butadiene, 1,3-pentadiene and isoprene.

The ethylenically unsaturated nitrile monomer comprises at least one selected from the group consisting of acrylonitrile, methacrylonitrile, fumaronitrile, α-chloronitrile and α-cyanoethylacrylonitrile.

The ethylenically unsaturated acid monomer comprises at least one selected from the group consisting of an ethylenically unsaturated carboxylic acid monomer, an ethylenically unsaturated sulfonic acid monomer and an ethylenically unsaturated acid anhydride monomer. More specifically, the ethylenically unsaturated acid monomer comprises at least one selected from the group consisting of acrylic acid, methacrylic acid, itaconic acid, maleic acid, fumaric acid, maleic anhydride, citraconic anhydride, styrenesulfonic acid, monobutyl fumarate, monobutyl maleate and mono-2-hydroxypropyl maleate, but the present invention is not limited thereto.

The optionally added other monomer copolymerizable with these monomers comprises at least one selected from the group consisting of: aromatic vinyl monomers selected from the group consisting of styrene, alkylstyrene and vinyl naphthalene; fluoroalkyl vinyl ethers such as fluoroethyl vinyl ether; ethylenically unsaturated amide monomers selected from the group consisting of (meth) acrylamide, N-methylol (meth) acrylamide, N,N-dimethylol (meth)acrylamide, N-methoxymethyl (meth)acrylamide and N-propoxymethyl (meth)acrylamide; non-conjugated diene monomers, such as vinyl pyridine, vinyl norbornene, dicyclopentadiene and 1,4-hexadiene; and ethylenically unsaturated carboxylic acid ester monomers selected from the group consisting of methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth) acrylate, cyanomethyl (meth) acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxymethyl (meth)acrylate, hydroxyethyl (meth)acrylate, hydroxypropyl (meth)acrylate, glycidyl (meth)acrylate and dimethylaminoethyl (meth) acrylate, but the present invention is not limited thereto.

Examples of the emulsifier include anionic surfactants, nonionic surfactants, cationic surfactants and amphoteric surfactants. More specifically, the emulsifier comprises at least one selected from the group consisting of alkylbenzene sulfonate, aliphatic sulfonate, sulfate ester of higher alcohol, α-olefin sulfonate and alkyl ether sulfate ester.

The polymerization initiator is preferably a radical initiator. The radical initiator comprises at least one selected from the group consisting of: inorganic peroxides such as sodium persulfate, potassium persulfate, ammonium persulfate, potassium perphosphate and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butylperoxy isobutyrate; azobisisobutyronitrile, azobis-2,4-dimethylvaleronitrile, azobiscyclohexane carbonitrile, and methyl azobisisobutyrate.

The molecular weight adjuster can be at least one selected from the group consisting of mercaptans such as α-methylstyrene dimers, t-dodecyl mercaptan, n-dodecyl mercaptan and octyl mercaptan; halogenated hydrocarbon such as carbon tetrachloride, methylene chloride and methylene bromide; sulfur-containing compounds such as tetraethylthiuram disulfide, dipentamethylenethiuram disulfide and diisopropylxanthogen disulfide.

The other additive may be an activator. The activator comprises at least one selected from the group consisting of sodium formaldehyde sulfoxylate, sodium ethylenediaminetetraacetate, ferrous sulfate, dextrose, sodium pyrophosphate and sodium sulfite.

The latex B is prepared by adding a conjugated diene monomer, an aromatic vinyl monomer, an ethylenically unsaturated nitrile monomer and an ethylenically unsaturated acid monomer, and adding optionally another monomer copolymerizable with these monomers and at least one selected from the group consisting of an emulsifier, a polymerization initiator, a molecular weight adjuster and other additives, followed by polymerization.

The conjugated diene monomer comprises at least one selected from the group consisting of 1,3-butadiene, 2,3-dimethyl-1,3-butadiene, 2-ethyl-1,3-butadiene, 1,3-pentadiene and isoprene, but the present invention is not limited thereto.

The aromatic vinyl monomer comprises at least one selected from the group consisting of styrene and alphamethyl styrene, but the present invention is not limited thereto.

The ethylenically unsaturated nitrile monomer comprises at least one selected from the group consisting of acrylonitrile, methacrylonitrile, fumaronitrile, α-chloronitrile and α-cyanoethylacrylonitrile, but the present invention is not limited thereto.

The ethylenically unsaturated acid monomer comprises at least one selected from the group consisting of an ethylenically unsaturated carboxylic acid monomer, an ethylenically unsaturated sulfonic acid monomer and an ethylenically unsaturated acid anhydride monomer. More specifically, the ethylenically unsaturated acid monomer comprises at least one selected from the group consisting of acrylic acid, methacrylic acid, itaconic acid, maleic acid, fumaric acid, maleic anhydride, citraconic anhydride, styrenesulfonic acid, monobutyl fumarate, monobutyl maleate and mono-2-hydroxypropyl maleate, but the present invention is not limited thereto.

The optionally added other monomer copolymerizable with these monomers comprises at least one selected from the group consisting of: aromatic vinyl monomers selected from the group consisting of alkylstyrene and vinyl naphthalene; fluoroalkyl vinyl ethers such as fluoroethyl vinyl ether; ethylenically unsaturated amide monomers selected from the group consisting of (meth)acrylamide, N-methylol (meth)acrylamide, N,N-dimethylol (meth)acrylamide, N-methoxymethyl (meth)acrylamide and N-propoxymethyl (meth)acrylamide; non-conjugated diene monomers such as vinyl pyridine, vinyl norbornene, dicyclopentadiene and 1,4-hexadiene; and ethylenically unsaturated carboxylic acid ester monomers selected from the group consisting of methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth) acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxymethyl (meth)acrylate, hydroxyethyl (meth)acrylate, hydroxypropyl (meth)acrylate, glycidyl (meth)acrylate and dimethylaminoethyl (meth)acrylate, but the present invention is not limited thereto.

Examples of the emulsifier include anionic surfactants, nonionic surfactants, cationic surfactants and amphoteric surfactants. More specifically, the emulsifier comprises at least one selected from the group consisting of alkylbenzene sulfonate, aliphatic sulfonate, sulfate ester of higher alcohol, α-olefin sulfonate and alkyl ether sulfate ester.

The polymerization initiator is preferably a radical initiator. The radical initiator comprises at least one selected from the group consisting of: inorganic peroxides such as sodium persulfate, potassium persulfate, ammonium persulfate, potassium perphosphate and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butylperoxy isobutyrate; azobisisobutyronitrile, azobis-2,4-dimethylvaleronitrile, azobiscyclohexane carbonitrile, and methyl azobisisobutyrate.

The molecular weight adjuster comprises at least one selected from the group consisting of: α-methylstyrene dimers; mercaptans such as t-dodecyl mercaptan, n-dodecyl mercaptan and octyl mercaptan; halogenated hydrocarbons such as carbon tetrachloride, methylene chloride and methylene bromide; and sulfur-containing compounds such as tetraethylthiuram disulfide, dipentamethylenethiuram disulfide and diisopropylxanthogen disulfide.

The other additive may be an activator. The activator comprises at least one selected from the group consisting of sodium formaldehyde sulfoxylate, sodium ethylenediaminetetraacetate, ferrous sulfate, dextrose, sodium pyrophosphate and sodium sulfite.

A specific example of a method for producing the latex A and the latex B will be described below.

1. Method for Preparing Latex A 40 to 90% by weight of a conjugated diene monomer, 9.9 to 50% by weight of an ethylenically unsaturated nitrile monomer and 0.1 to 10% by weight of an ethylenically unsaturated acid monomer with respect to 100 parts by weight which is the total weight of the monomers were added to a container containing an aqueous solution, 0.3 to 10 parts by weight of an emulsifier, 0.01 to 2 parts by weight of a polymerization initiator and 0.1 to 2.0 parts by weight of a molecular weight adjuster with respect to 100 parts by weight which is the total weight of the monomers were added thereto, polymerization was initiated at a temperature of 20 to 60° C., polymerization was continued at an elevated temperature of 50 to 90° C. when a conversion ratio reached 45 to 75%, and polymerization was stopped by addition of a base such as ammonium hydroxide when the conversion ratio reached 84 to 99%, to prepare a latex A.

When a carboxylic acid modified-nitrile copolymer latex was prepared in the same manner as above, a latex A having a glass transition temperature of −60 to −10° C. could be prepared.

2. Method for Preparing Latex B 1 to 10% by weight of a conjugated diene monomer, 65 to 96% by weight of an aromatic vinyl monomer, 1 to 20% by weight of an ethylenically unsaturated acid monomer, 1 to 7% by weight of a vinyl cyanide monomer and 1 to 20% by weight of other copolymerizable vinyl monomer were polymerized to prepare a latex B.

The latex B may be prepared by two steps or multiple steps. Commonly, the latex B may be prepared by preparing a seed latex and polymerizing the seed latex such that the seed latex is coated with one to three shells. In addition, polymerization was performed under other reaction conditions, associated with water, a polymerization initiator, an emulsifier and an electrolyte, in accordance with an ordinary emulsion polymerization method.

Meanwhile, the copolymer composition comprising the latex A and the latex B, for example, comprises the latex A and the latex B in an amount of 80 to 99% by weight, 85 to 98% by weight, or 88 to 97% by weight, based on solid content (balance corresponds to additives, minor ingredients and a combination thereof). Within this range, rubber gloves which are a kind of finally produced dip-formed articles advantageously exhibit superior physical properties.

The copolymer composition may comprise at least one additives selected from the group consisting of a vulcanizing agent, a vulcanizing accelerator, an ionic crosslinking agent, a pigment such as titanium oxide, a filler such as silica, a thickener and a pH controller such as ammonia or alkali hydroxide.

In addition, minor ingredients such as chelating agents, dispersants, oxygen absorbers, particle size modifiers, antioxidants and oxygen scavengers may be optionally added during the polymerization of the latexes A and B.

A solid content meaning a content of the copolymer composition, excluding water is for example 10 to 40% by weight (water content: 60 to 90%), or 15 to 35% by weight, or 18 to 33% by weight.

For example, water may be further added to adjust the solid content.

The copolymer composition may, for example, have a pH of 8.0 to 12, 9 to 11, or 9.3 to 10.5.

In addition, the dip-formed article according to the present invention is obtained by dip-forming the copolymer composition comprising the latex A and the latex B.

The dip-forming method is not particularly limited and may be selected from methods commonly used in the art. Examples of the dip-forming method include direct dipping, anode coagulation dipping and Teague's coagulation dipping. Of these, coagulation dipping is preferred because the dip-formed article with a uniform thickness can be easily produced.

The method for producing the dip-formed article comprises: a) applying a coagulant solution to a mold, followed by drying; b) applying a carboxylic acid modified-nitrile based copolymer composition for dip-forming to the coagulant-applied mold to form a dip-forming layer; c) cross-linking the dip-forming layer; and d) peeling the cross-linked dip-forming layer from the mold to obtain a dip-formed article.

The method for producing the dip-formed article will be described in detail below.

First, a hand-shaped mold for dip-forming is immersed in a coagulant solution to adhere a coagulant to a mold surface.

Examples of the coagulant include: metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Of these, calcium chloride and calcium nitrate are preferred.

The coagulant solution is a solution prepared by dissolving the coagulant in water, alcohol or a mixture thereof. The concentration of the coagulant in the coagulant solution is typically 5 to 75% by weight, or 15 to 55% by weight, or 18 to 40% by weight.

Then, the mold for dip-forming to which the coagulant is adhered is immersed in a carboxylic acid modified-nitrile copolymer latex composition for dip-forming, the mold for dip-forming is taken out from the composition and a dip-forming layer is formed on the mold. Next, the dip-forming layer formed on the mold for dip-forming is heated to cross-link the carboxylic acid modified-nitrile copolymer latex. During heating, water is evaporated and vulcanization is then performed by crosslinking. Then, the dip-forming layer cross-linked by heating was peeled from the mold for dip-forming to obtain a dip-formed article.

The method according to the present invention may be applied to any latex article that can be produced by dip-molding well-known in the art. Specifically, the method may be applied to a dip-formed latex article selected from health care articles such as surgical gloves, examination gloves, condoms, catheters or a variety of industrial and household gloves.

Hereinafter, the present invention will be described in detail with reference to the following synthesis examples and examples and these examples should not be construed as limiting the scope of the present invention. In addition, the dip-formed article is evaluated in accordance with the following method.

EXAMPLE

Synthesis Example 1

Latex A 21 parts by weight of acrylonitrile, 74 parts by weight of 1,3-butadiene, 5 parts by weight of methacrylic acid, 0.6 parts by weight of tert-dodecyl mercaptan, 2.3 parts by weight of sodium dodecylbenzenesulfonate, 140 parts by weight of water and 0.3 parts by weight of potassium persulfate were added to a reactor and polymerization was performed at an elevated temperature of 40° C. Polymerization was performed at an elevated temperature of 70° C. when a conversion ratio reached 65% and polymerization was stopped by adding 0.3 parts by weight of ammonium hydroxide, when the conversion ratio reached 94%. Then, unreacted monomers were removed by deodorization, and aqueous ammonia, an antioxidant and a defoaming agent were added to obtain a carboxylic acid modified-nitrile copolymer latex having a solid content of 45.0% and a pH of 8.0.

As a result of DSC analysis (manufacturer: TA Instruments Inc., product name: DSC Q10), the latex had a Tg of −37° C. and as a result of dynamic light scattering (DLS) analysis (manufacturer: PSS Corp., product name: NICOMP 380 DLS), the latex had an average particle diameter of 131 nm.

Synthesis Example 2

Latex A 12 parts by weight of acrylonitrile, 83 parts by weight of 1,3-butadiene, 5 parts by weight of methacrylic acid, 0.6 parts by weight of tert-dodecyl mercaptan, 2.3 parts by weight of sodium dodecylbenzenesulfonate, 140 parts by weight of water and 0.3 parts by weight of potassium persulfate were added to a reactor and polymerization was initiated at an elevated temperature of 40° C. Polymerization was performed at an elevated temperature of 70° C. when a conversion ratio reached 65% and polymerization was stopped by adding 0.3 parts by weight of ammonium hydroxide, when the conversion ratio reached 94%. Then, unreacted monomers were removed by deodorization, and aqueous ammonia, an antioxidant and a defoaming agent were added to obtain a carboxylic acid modified-nitrile copolymer latex having a solid content of 45.0% and a pH of 8.0.

As a result of DSC analysis, the latex had a Tg of −47° C. and as a result of DLS analysis, the latex had an average particle diameter of 125 nm.

Synthesis Example 3

Latex A 37 parts by weight of acrylonitrile, 58 parts by weight of 1,3-butadiene, 5 parts by weight of methacrylic acid, 0.6 parts by weight of tert-dodecyl mercaptan, 2.3 parts by weight of sodium dodecylbenzenesulfonate, 140 parts by weight of water and 0.3 parts by weight of potassium persulfate were added to a reactor and polymerization was initiated at an elevated temperature of 40° C. Polymerization was performed at an elevated temperature of 70° C. when a conversion ratio reached 65% and polymerization was stopped by adding 0.3 parts by weight of ammonium hydroxide, when the conversion ratio reached 94%. Then, unreacted monomers were removed by deodorization, and aqueous ammonia, an antioxidant and a defoaming agent were added to obtain a carboxylic acid modified-nitrile copolymer latex having a solid content of 45.0% and a pH of 8.0.

As a result of DSC analysis, the latex had a Tg of −15° C. and as a result of DLS analysis, the latex had an average particle diameter of 138 nm.

Synthesis Example 4

Latex A 21 parts by weight of acrylonitrile, 74 parts by weight of 1,3-butadiene, 5 parts by weight of methacrylic acid, 0.6 parts by weight of tert-dodecyl mercaptan, 2.3 parts by weight of sodium dodecylbenzenesulfonate, 140 parts by weight of water and 0.6 parts by weight of potassium persulfate were added to a reactor, and polymerization was initiated at an elevated temperature of 40° C. Polymerization was performed at an elevated temperature of 70° C. when a conversion ratio reached 65% and polymerization was stopped by adding 0.3 parts by weight of ammonium hydroxide, when the conversion ratio reached 92%. Then, unreacted monomers were removed by deodorization, and aqueous ammonia, an antioxidant and a defoaming agent were added to obtain a carboxylic acid modified-nitrile copolymer latex having a solid content of 45.0% and a pH of 8.0.

As a result of DSC analysis, the latex had a Tg of −37° C. and as a result of DLS analysis, the latex had an average particle diameter of 90 nm.

Synthesis Example 5

Latex B

The latex B was prepared in the following two-step process.

First Step 34 parts by weight of 1,3-butadiene, 48 parts by weight of styrene, 10 parts by weight of methyl methacrylate, 3 parts by weight of acrylonitrile, 5 parts by weight of itaconic acid, 6 parts by weight of sodium dodecylbenzenesulfonate, 0.2 parts by weight of tert-dodecyl mercaptan, 0.4 parts by weight of sodium bicarbonate and 420 parts by weight of ion exchanged water were added to a reactor and the temperature was elevated to 65° C. 0.8 parts by weight of potassium persulfate as a polymerization initiator was added to the container and the resulting mixture was stirred for about 300 minutes to complete seed polymerization. At this time, the seed thus obtained had an average particle diameter of 79 nm and a conversion ratio was 97%.

Second Step 8 parts by weight of the seed latex obtained in the first step was added to a reactor, the temperature was elevated to 80° C., 3 parts by weight of 1,3-butadiene, 61 parts by weight of styrene, 18 parts by weight of methyl methacrylate, 5 parts by weight of acrylonitrile, 5 parts by weight of itaconic acid, 5 parts by weight of methacrylic acid, 3 parts by weight of acryl amide, 0.3 parts by weight of sodium dodecylbenzenesulfonate, 0.1 parts by weight of tert-dodecyl mercaptan, 0.4 parts by weight of sodium bicarbonate, 95 parts by weight of ion exchanged water and 1.0 part by weight of potassium persulfate were continuously added to the reactor for 360 minutes, and polymerization was performed.

After addition of the ingredients, the reaction solution was further stirred for 180 minutes while reaction was facilitated by elevating the temperature to 90° C. to complete polymerization. The final latex B had an average particle diameter of 218 nm, a conversion ratio of 99% and a glass transition temperature of 88° C.

Synthesis Example 6

Latex B

The latex B was prepared in the following two-step process.

First Step

A seed was prepared in the same manner as the first step of Synthesis Example 5.

Second Step 3 parts by weight of the seed latex obtained in the first step was added to a reactor, the temperature was elevated to 80° C., 3 parts by weight of 1,3-butadiene, 61 parts by weight of styrene, 18 parts by weight of methyl methacrylate, 5 parts by weight of acrylonitrile, 5 parts by weight of itaconic acid, 5 parts by weight of methacrylic acid, 3 parts by weight of acryl amide, 0.3 parts by weight of sodium dodecylbenzenesulfonate, 0.1 parts by weight of tert-dodecyl mercaptan, 0.4 parts by weight of sodium bicarbonate, 95 parts by weight of ion exchanged water and 1.0 part by weight of potassium persulfate were continuously added to the reactor for 360 minutes, and polymerization was performed.

After addition of the ingredients, the reaction solution was further stirred for 180 minutes while reaction was facilitated by elevating the temperature to 90° C. to complete polymerization. The final latex B had an average particle diameter of 293 nm, a conversion ratio of 99% and a glass transition temperature of 88° C.

Synthesis Example 7

Latex A 21 parts by weight of acrylonitrile, 74 parts by weight of 1,3-butadiene, 5 parts by weight of methacrylic acid, 0.6 parts by weight of tert-dodecyl mercaptan, 1.8 parts by weight of sodium dodecylbenzenesulfonate, 0.5 parts by weight of sodium bicarbonate, 140 parts by weight of water and 0.3 parts by weight of potassium persulfate were added to a reactor and polymerization was initiated at an elevated temperature of 40° C. Polymerization was performed at an elevated temperature of 70° C. when a conversion ratio reached 65% and polymerization was stopped by adding 0.3 parts by weight of ammonium hydroxide when the conversion ratio reached 94%. Then, unreacted monomers were removed by deodorization, and aqueous ammonia, an antioxidant and a defoaming agent were added to obtain a carboxylic acid modified-nitrile copolymer latex having a solid content of 45.0% and a pH of 8.0.

As a result of DSC analysis, the latex had a Tg of –37° C. and as a result of DLS analysis, the latex had an average particle diameter of 180 nm.

Synthesis Example 8

Latex B

The latex B was prepared in the following two-step process.

First Step

A seed was prepared in the same manner as the first step of Synthesis Example 5.

Second Step 18 parts by weight of the seed latex obtained in the first step was added to a reactor, the temperature was elevated to 80° C., 3 parts by weight of 1,3-butadiene, 61 parts by weight of styrene, 18 parts by weight of methyl methacrylate, 5 parts by weight of acrylonitrile, 5 parts by weight of itaconic acid, 5 parts by weight of methacrylic acid, 3 parts by weight of acryl amide, 0.3 parts by weight of sodium dodecylbenzenesulfonate, 0.1 parts by weight of tert-dodecyl mercaptan, 0.4 parts by weight of sodium bicarbonate, 95 parts by weight of ion exchanged water and 1.0 part by weight of potassium persulfate were continuously added to the reactor for 360 minutes, and polymerization was performed.

After addition of the ingredients, the reaction solution was further stirred for 180 minutes while reaction was facilitated by elevating the temperature to 90° C. to complete polymerization. The final latex B had an average particle diameter of 142 nm, a conversion ratio of 99% and a glass transition temperature of 89° C.

Example 1

The latex prepared in Synthesis Example 1 and the latex prepared in Synthesis Example 5 were mixed at a weight ratio of Synthesis Example 1 to Synthesis Example 5 of 97:3 (based on solid content, hereinafter, the same will be applied). Then, 5.73 parts by weight of a dispersion prepared by mixing 0.03 parts by weight of potassium hydroxide, 0.7 parts by weight of titanium oxide and 5 parts by weight of double distilled water was mixed with 333 parts by weight of the latex mixture (solid content: 100 parts by weight), and double distilled water was further added to the mixture, to prepare a carboxylic acid modified-nitrile based copolymer composition for dip-forming having a solid content of 30%.

Then, 22 parts by weight of calcium nitrate, 69.5 parts by weight of methanol, 8 parts by weight of calcium carnbonate, and 0.5 parts by weight of a wetting agent (Teric 320 produced by Huntsman Corporation, Australia) were mixed to prepare a coagulant solution. A hand-shaped ceramic mold was dipped in the solution for one minute, was taken out and was then dried at 70° C. for 3 minutes to apply the coagulant to the hand-shaped mold.

Then, the mold to which the coagulant was applied was dipped in the carboxylic acid modified-nitrile based copolymer composition for dip-forming for one minute, was taken out, dried at 70° C. for one minute and was leached by dipping in water or hot water. The mold was dried at 70° C. for 3 minutes and cross-linked at 125° C. for 20 minutes. Then, the cross-linked dip-forming layer was peeled from the hand-shaped mold to produce a glove-shaped dip-formed article and physical properties thereof are shown in the following Table 1.

Example 2

A rubber glove-shaped dip-formed article was produced in the same manner as in Example 1, except that the latex prepared in Synthesis Example 1 and the latex prepared in Synthesis Example 5 were mixed at a weight ratio of Synthesis Example 1 to Synthesis Example 5 of 90:10 and physical properties thereof are shown in the following Table 1.

Example 3

A rubber glove-shaped dip-formed article was produced in the same manner as in Example 1, except that the latex prepared in Synthesis Example 1 and the latex prepared in Synthesis Example 5 were mixed at a weight ratio of Synthesis Example 1 to Synthesis Example 5 of 85:15 and physical properties thereof are shown in the following Table 1.

Example 4

A rubber glove-shaped dip-formed article was produced in the same manner as in Example 1, except that the latex prepared in Synthesis Example 2 and the latex prepared in Synthesis Example 5 were mixed at a weight ratio of Synthesis Example 2 to Synthesis Example 5 of 90:10 and physical properties thereof are shown in the following Table 1.

Example 5

A rubber glove-shaped dip-formed article was produced in the same manner as in Example 1, except that the latex prepared in Synthesis Example 3 and the latex prepared in Synthesis Example 5 were mixed at a weight ratio of Synthesis Example 3 to Synthesis Example 5 of 90:10 and physical properties thereof are shown in the following Table 1.

Comparative Example 1

A rubber glove-shaped dip-formed article was produced in the same manner as in Example 1, except that the latex prepared in Synthesis Example 1 was used alone and physical properties thereof are shown in the following Table 1.

Comparative Example 2

A rubber glove-shaped dip-formed article was produced in the same manner as in Example 1, except that the latex prepared in Synthesis Example 4 and the latex prepared in Synthesis Example 5 were mixed at a weight ratio of Synthesis Example 4 to Synthesis Example 5 of 90:10 and physical properties thereof are shown in the following Table 1.

Comparative Example 3

A rubber glove-shaped dip-formed article was produced in the same manner as in Example 1, except that the latex prepared in Synthesis Example 1 and the latex prepared in Synthesis Example 6 were mixed at a weight ratio of Synthesis Example 1 to Synthesis Example 6 of 90:10 and physical properties thereof are shown in the following Table 1.

Comparative Example 4

A rubber glove-shaped dip-formed article was produced in the same manner as in Example 1, except that the latex prepared in Synthesis Example 7 and the latex prepared in Synthesis Example 8 were mixed at a weight ratio of Synthesis Example 7 to Synthesis Example 8 of 90:10 and physical properties thereof are shown in the following Table 1.

Comparative Example 5

A rubber glove-shaped dip-formed article was produced in the same manner as in Example 1, except that the latex prepared in Synthesis Example 7 and the latex prepared in Synthesis Example 5 were mixed at a weight ratio of Synthesis Example 7 to Synthesis Example 5 of 90:10 and physical properties thereof are shown in the following Table 1.

Comparative Example 6

A rubber glove-shaped dip-formed article was produced in the same manner as in Example 1, except that the latex prepared in Synthesis Example 1 and the latex prepared in Synthesis Example 8 were mixed at a weight ratio of Synthesis Example 1 to Synthesis Example 8 of 90:10 and physical properties thereof are shown in the following Table 1.

Test Example

Physical properties of articles produced in Examples 1 to 5 and Comparative Examples 1 to 6 were measured in accordance with the following method and results are shown in the following Table 1.

Particle diameter: average particle diameter (NICOMP average particle diameter) was measured using NICOMP 380DLS as a particle analysis system produced by PSS Corp.

Glass transition temperature was measured using DSC Q100 (TA Instruments Inc.).

Tensile strength, elongation, and modulus at an elongation of 300% (modulus at 300%): a dumbbell-shaped specimen was produced in accordance with ASTM D-412. Then, the specimen was drawn at an elongation rate of 500 mm/min, and modulus at an elongation of 300%, tensile strength at break and elongation at break were measured.

Measurement of friction coefficient: friction coefficient was measured in order to evaluate wearing sensation and doping property. A friction coefficient meter using a spring balance regulated by ASTM D 1894-78 was produced by a modified method and static friction coefficient and dynamic friction coefficient of film surfaces were measured. A smooth wood plate with a width, a length and a thickness of 125 cm, 26 cm and 3 cm, respectively, was used as a support, the spring balance and a decelerated DC motor were attached to the support and friction coefficient was tested by drawing at a predetermined rate (about 160 mm/min). A PMMA flat plate having a width, a length and a thickness of 30 cm, 15 cm and 0.1 cm, respectively, was used as a plastic plate which contacted the surface of the support to which the film was attached and then slipped. A friction coefficient was calculated in accordance with the following equation from forces applied to the spring balance.

Calculation of static friction coefficient:

$$\mu s = \frac{As}{B}$$

Calculation of dynamic friction coefficient $$\mu K = \frac{Ak}{C}$$

wherein μs represents a static friction coefficient,
μK represents a dynamic friction coefficient, As represents a read value at first movement (g),
Ak represents an average read value at first movement (g),
B represents a weight of a specimen (g),
C represents a weight of a sled (g).

TABLE 1

| Types | Tensile strength (MPa) | Elongation (%) | Modulus at 300% elongation (MPa) | Modulus at 500% elongation (MPa) | Static friction coefficient | Dynamic friction coefficient |
|---|---|---|---|---|---|---|
| Example 1 | 38.5 | 550.0 | 7.3 | 26.9 | 0.8 | 0.7 |
| Example 2 | 36.7 | 528.0 | 8.5 | 28.1 | 0.6 | 0.4 |
| Example 3 | 35.5 | 517.0 | 8.8 | 29.8 | 0.4 | 0.3 |
| Example 4 | 36.3 | 580.0 | 6.1 | 24.3 | 1.0 | 0.9 |
| Example 5 | 35.8 | 515.0 | 9.0 | 31.4 | 0.3 | 0.2 |
| Comparative Example 1 | 35.6 | 544.0 | 6.5 | 24.8 | 1.7 | 1.6 |
| Comparative Example 2 | 30.0 | 430.0 | 10.3 | Measurement is impossible | 1.5 | 1.4 |
| Comparative Example 3 | 36.1 | 538.0 | 6.7 | 25.6 | 1.4 | 1.2 |
| Comparative Example 4 | 28.7 | 525.0 | 6.2 | 23.5 | 1.2 | 1.1 |
| Comparative Example 5 | 26.5 | 520.1 | 5.8 | 23.0 | 1.4 | 1.3 |
| Comparative Example 6 | 32.3 | 530.3 | 6.7 | 25.3 | 1.5 | 1.4 |

As can be seen from Table 1 above, in accordance with Examples 1 to 5 in which a ratio of Synthesis Example 1 to Synthesis Example 5 is 98:2 to 76:24, rubber glove-type dip-formed articles having superior mechanical properties, and excellent wearing sensation and doping property are produced.

On the other hand, it can be seen that Comparative Example 1 in which the latex produced in Synthesis Example 1 is used alone exhibits low wearing sensation and doping property.

In addition, it can be seen that Comparative Example 2 in which a latex (Synthesis Example 4) having an average particle diameter less than 100 nm is contained exhibits deterioration in physical properties of the glove and insufficient improvement of wearing sensation and doping property.

In addition, it can be seen that Comparative Example 3 in which a latex (Synthesis Example 6) having an average particle diameter greater than 260 nm is contained exhibits insufficient improvement of wearing sensation and doping property.

In addition, it can be seen that Comparative Example 4 in which a latex (Synthesis Example 7) having a low Tg and an average particle diameter greater than 160 nm and a latex (Synthesis Example 8) having a high Tg and an average particle diameter less than 160 nm are contained exhibits great deterioration in physical properties of the glove and insufficient improvement of wearing sensation and doping property.

In addition, it can be seen that Comparative Examples and 6 in which the average particle diameter of the latex (A) is greater than 160 nm and the average particle diameter of the latex (B) is less than 160 nm exhibit great deterioration in physical properties of the glove and low wearing sensation and doping property.

For reference, when a dip-formed article is produced using only the latex produced in Synthesis Example 5, the produced dip-formed article is too hard such that the film was broken and it is thus impossible to measure physical properties of the article.

What is claimed is:

1. A copolymer composition comprising:
   a carboxylic acid modified-nitrile copolymer latex (A) having a glass transition temperature of a −60 to −10° C. and a carboxylic acid modified-styrene copolymer latex (B) having a glass transition temperature of 30 to 110° C.,
   wherein the carboxylic acid modified-nitrile copolymer latex (A) has an average particle diameter of 100 to 160 nm and the carboxylic acid modified-styrene copolymer latex (B) has an average particle diameter of 160 to 260 nm, and
   wherein the carboxylic acid modified-nitrile copolymer latex (A) and the carboxylic acid modified-styrene copolymer latex (B) are present in a weight ratio (A:B) of 98:2 to 76:24.

2. The copolymer composition according to claim 1, wherein the carboxylic acid modified-nitrile copolymer latex (A) having a glass transition temperature of −60 to −10° C. and the carboxylic acid modified-styrene copolymer latex (B) having a glass transition temperature of 30 to 110° C. are present in an amount of 80 to 99% by weight with respect to the weight of the copolymer composition.

3. The copolymer composition according to claim 1, wherein the carboxylic acid modified-nitrile copolymer latex (A) comprises a conjugated diene monomer, an ethylenically unsaturated nitrile monomer and an ethylenically unsaturated acid monomer.

4. The copolymer composition according to claim 1, wherein the carboxylic acid modified-styrene copolymer latex (B) comprises a conjugated diene monomer, an aromatic vinyl monomer, an ethylenically unsaturated nitrile monomer and an ethylenically unsaturated acid monomer.

5. The copolymer composition according to claim 3, wherein the conjugated diene monomer comprises at least one selected from the group consisting of 1,3-butadiene, 2,3-dimethyl-1,3-butadiene, 2-ethyl-1,3-butadiene, 1,3-pentadiene and isoprene.

6. The copolymer composition according to claim 3, wherein the ethylenically unsaturated nitrile monomer comprises at least one selected from the group consisting of acrylonitrile, methacrylonitrile, fumaronitrile, α-chloronitrile and α-cyanoethylacrylonitrile.

7. The copolymer composition according to claim 3, wherein the ethylenically unsaturated acid monomer comprises at least one selected from the group consisting of an ethylenically unsaturated carboxylic acid monomer, an ethylenically unsaturated sulfonic acid monomer and an ethylenically unsaturated acid anhydride monomer.

8. The copolymer composition according to claim 7, wherein the ethylenically unsaturated acid monomer comprises at least one selected from the group consisting of acrylic acid, methacrylic acid, itaconic acid, maleic acid, fumaric acid, maleic anhydride, citraconic anhydride, styrenesulfonic acid, monobutyl fumarate, monobutyl maleate and mono-2-hydroxypropyl maleate.

9. The copolymer composition according to claim 4, wherein the aromatic vinyl monomer comprises at least one selected from the group consisting of styrene and alkyl styrene.

10. The copolymer composition according to claim 9, wherein the alkyl styrene comprises alpha-methyl styrene.

11. The copolymer composition according to claim 3, wherein the carboxylic acid modified-nitrile copolymer latex (A) further comprises at least one selected from the group consisting of styrene, alkyl styrene, vinyl naphthalene, fluoroethyl vinyl ether, (meth)acrylamide, N-methylol (meth)acrylamide, N,N-dimethylol (meth)acrylamide, N-methoxymethyl (meth)acrylamide, N-propoxymethyl (meth)acrylamide, vinyl pyridine, vinyl norbornene, dicyclopentadiene, 1,4-hexadiene, methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxymethyl (meth)acrylate, hydroxyethyl (meth)acrylate, hydroxypropyl (meth)acrylate, glycidyl (meth)acrylate and dimethylaminoethyl (meth)acrylate.

12. The copolymer composition according to claim 4, wherein the carboxylic acid modified-styrene copolymer latex (B) further comprises at least one selected from the group consisting of vinyl naphthalene, fluoroethyl vinyl ether, (meth)acrylamide, N-methylol (meth)acrylamide, N,N-dimethylol (meth)acrylamide, N-methoxymethyl (meth)acrylamide, N-propoxymethyl (meth)acrylamide, vinyl pyridine, vinyl norbornene, dicyclopentadiene, 1,4-hexadiene, methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxymethyl (meth)acrylate, hydroxyethyl (meth)acrylate, hydroxypropyl (meth)acrylate, glycidyl (meth)acrylate and dimethylaminoethyl (meth)acrylate.

13. The copolymer composition according to claim 1, wherein the copolymer composition comprises at least one selected from the group consisting of a vulcanizing agent, an ionic crosslinking agent, a pigment, a filler, a thickener and a pH adjuster.

14. A dip-formed article produced by dip-forming the copolymer composition according claim 1.

15. The copolymer composition according to claim 4, wherein the conjugated diene monomer comprises at least one selected from the group consisting of 1,3-butadiene, 2,3-dimethyl-1,3-butadiene, 2-ethyl-1,3-butadiene, 1,3-pentadiene and isoprene.

16. The copolymer composition according to claim 4, wherein the ethylenically unsaturated nitrile monomer comprises at least one selected from the group consisting of acrylonitrile, methacrylonitrile, fumaronitrile, α-chloronitrile and α-cyanoethylacrylonitrile.

17. The copolymer composition according to claim 4, wherein the ethylenically unsaturated acid monomer comprises at least one selected from the group consisting of an ethylenically unsaturated carboxylic acid monomer, an ethylenically unsaturated sulfonic acid monomer and an ethylenically unsaturated acid anhydride monomer.

* * * * *